(12) United States Patent
Manico et al.

(10) Patent No.: US 6,312,172 B1
(45) Date of Patent: Nov. 6, 2001

(54) METHOD AND APPARATUS FOR PHOTOFINISHING A PHOTOSENSITIVE MEDIA AND/OR ORDERING OF IMAGE PRODUCTS

(75) Inventors: Joseph A. Manico, Rochester; Dale F. McIntyre, Honeoye Falls, both of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/667,058

(22) Filed: Sep. 21, 2000

Related U.S. Application Data

(62) Division of application No. 09/451,732, filed on Nov. 30, 1999, now Pat. No. 6,174,094.

(51) Int. Cl.$^7$ ...................................................... G03D 5/00
(52) U.S. Cl. ........................... 396/604; 355/27; 396/571; 396/575
(58) Field of Search ..................................... 396/604, 606, 396/568–570, 571, 575; 355/18, 27–29, 40, 41

(56) References Cited

U.S. PATENT DOCUMENTS

| 3,747,493 | 7/1973 | Glidden et al. | 396/30 |
|---|---|---|---|
| 3,778,140 | 12/1973 | Land | 352/130 |
| 4,485,294 | 11/1984 | Rosenberg | 219/216 |
| 4,531,819 | * 7/1985 | Katsuyama | 355/28 |
| 4,561,745 | 12/1985 | Kinsman et al. | 396/571 |
| 5,031,852 | * 7/1991 | Dowling et al. | 396/516 |
| 5,113,351 | * 5/1992 | Bostic | 235/381 |
| 5,200,777 | * 4/1993 | Zander | 396/513 |
| 5,543,882 | * 8/1996 | Pagano et al. | 396/595 |
| 5,627,016 | * 5/1997 | Manico | 430/434 |
| 5,745,811 | * 4/1998 | Okino et al. | 396/567 |
| 5,975,771 | * 11/1999 | Ogiwara | 396/567 |
| 5,988,896 | * 11/1999 | Edgar | 396/604 |

FOREIGN PATENT DOCUMENTS

| 0 741 327 | 11/1996 | (EP) . |
|---|---|---|
| 98/40786 | 9/1998 | (WO) . |

* cited by examiner

*Primary Examiner*—D Rutledge
(74) *Attorney, Agent, or Firm*—Frank Princelli

(57) ABSTRACT

A method and apparatus for developing a strip of photosensitive media having image exposure area having an undeveloped exposed portion thereon. The apparatus includes a transport mechanism for moving the photosensitive media along a processing path; and a mechanism positioned along the processing path for selectively applying a coating of the processing solution only on the undeveloped exposed portion of the strip of photosensitive media. The apparatus further includes sensors for determining the location of the undeveloped exposed portion of the image exposure area. A scanner may be provided for scanning the strip of photosensitive media so as to obtain a digital record of the images developed thereon.

3 Claims, 15 Drawing Sheets

METHOD AND APPARATUS FOR PHOTOFINISHING A PHOTOSENSITIVE MEDIA AND/OR ORDERING OF IMAGE PRODUCTS

CROSS REFERENCE TO RELATED APPLICATIONS

This application is a divisional of application Ser. No. 09/451,732 filed Nov. 30, 1999, now U.S. Pat. No. 6,174, 094.

U.S. Ser. No. 09/451,997, filed, Nov. 30, 1999, entitled "METHOD AND APPARATUS FOR PHOTOFINISHING A PHOTOSENSITIVE MEDIA AND/OR ORDERING OF IMAGE PRODUCTS".

U.S. Ser. No. 09/452,006, filed, Nov. 30, 1999, entitled "METHOD AND APPARATUS FOR PHOTOFINISHING A PHOTOSENSITIVE MEDIA AND/OR ORDERING OF IMAGE PRODUCTS".

FIELD OF THE INVENTION

The present invention relates to photofinishing of photosensitive material, and more particularly, to a method and apparatus for photofinishing a photosensitive material using an apparently dry development process.

BACKGROUND OF THE INVENTION

Typical photofinishing of photosensitive media, such as film, comprises the development of the photosensitive media using wet processing system followed by printing of the image onto a second photosensitive media, which is also processed using a conventional wet process system. Conventional wet process comprises the passing of the film through a plurality of processing tanks, each tank containing a processed solution. Such conventional wet processing is relatively time-consuming, restricted to specific types of films, must be carefully monitored and maintained in order to ensure consistent high quality, special care must be taken in the using and disposal of the processing solutions.

There has also been suggested in the prior art the providing of a fully automated photofinishing device wherein a customer can walk up to the device, insert a film cartridge, and have the enclosed film processed. An example of such a system is disclosed in U.S. Pat. No. 5,113,351, wherein a conventional wet processing system is utilized. As previously mentioned, this type of wet processing system requires careful maintenance of the chemistry in order to insure consistent high quality. Additionally, the wet processing is limited to typically one type chemistry used for processing of a particular type film. In addition, typical wet processing systems are not suitable for doing partial roll development.

There has also been suggested in the prior art a Bi-Mat development system whereby 35 mm instant color slide film is developed. An example of such a system is the PolaChrome CS 35 mm instant color slide film, which incorporates a black and white emulsion layer provided on a substrate and an additive color screen which is used to produce color images. Once the film has been exposed, it is placed in a device whereby a donor strip is coated with a processing solution, which is then caused to come in contact with the exposed film through use of a pair of laminating rollers. Since the emulsion is a black and white emulsion, only a single processing solution is applied. A problem with this system is that it sacrifices film speed, D-min density, an image quality in order to obtain visually acceptable slide image.

U.S. Pat. No. 5,627,016 discloses a system similar to the Bi-Mat system, which is relatively simple and low cost. While the system disclosed therein provides an improvement over the PolaChrome CS 35 mm system, it is not suitable for use with film having substantially different chemistry and is not designed for doing partial roll developing and printing.

The present invention provides a method and apparatus for photofinishing a variety of different type photosensitive materials using a single, simple low-cost device. Additionally, the system allows for partial roll development and allows the providing of a large variety of different custom image products to be produced.

SUMMARY OF THE INVENTION

In accordance with one aspect of the present invention there is provided an apparatus for developing a strip of photosensitive media having image exposure area having an undeveloped exposed portion thereon, comprising:

a transport mechanism for moving the photosensitive media along a processing path; and a mechanism positioned along the processing path for selectively applying a coating of the processing solution only on the undeveloped exposed portion of the strip of photosensitive media.

In accordance with another aspect of the present invention there is provided an apparatus for developing a strip photosensitive media having image exposure area having an undeveloped exposed portion thereon, comprising:

a transport mechanism for moving the photosensitive media along a processing path;

means for determining the location of the undeveloped exposed portion of the image exposure area; and a mechanism positioned along the processing path for applying a coating of the processing solution on the undeveloped exposed portion of the photosensitive.

In accordance with yet another aspect of the present invention there is provided a method for developing a strip of photosensitive media provided in a film cartridge, the photosensitive media having a back side, a front side, and an emulsion layer on the front side, comprising the steps of:

a) moving the filmstrip along a film path;

b) applying a developing solution on the emulsion layer so as to develop any exposed images present on the strip of film media;

c) scanning the strip of photosensitive media after the exposed images have been developed; and d) cleaning the filmstrip prior to returned to the cartridge.

In accordance with yet another aspect of the present invention there is provided a method for developing a strip photosensitive media having image exposure area having an undeveloped exposed portion thereon, comprising the steps of:

transporting the photosensitive media along a processing path;

determining the location of the undeveloped exposed portion of the image exposure area; and applying a coating of the processing solution on the undeveloped exposed portion of the photosensitive In still yet another aspect of the present invention there is provided a method for developing a strip photosensitive media having image exposure area having an undeveloped exposed portion thereon, comprising the steps of:

moving the photosensitive media along a processing; and selectively applying a coating of the processing solution only on the undeveloped exposed portion of the photosensitive.

These and other advantages of the present invention will be more clearly understood and appreciated from a review of the following detailed description and appended claims, and by reference to the accompanying drawings.

BRIEF DESCRIPTION OF THE DRAWINGS

In the detailed description of the preferred embodiments of the invention presented below, reference is made to the accompanying drawings in which.

DETAILED DESCRIPTION OF THE INVENTION

Figure 1:
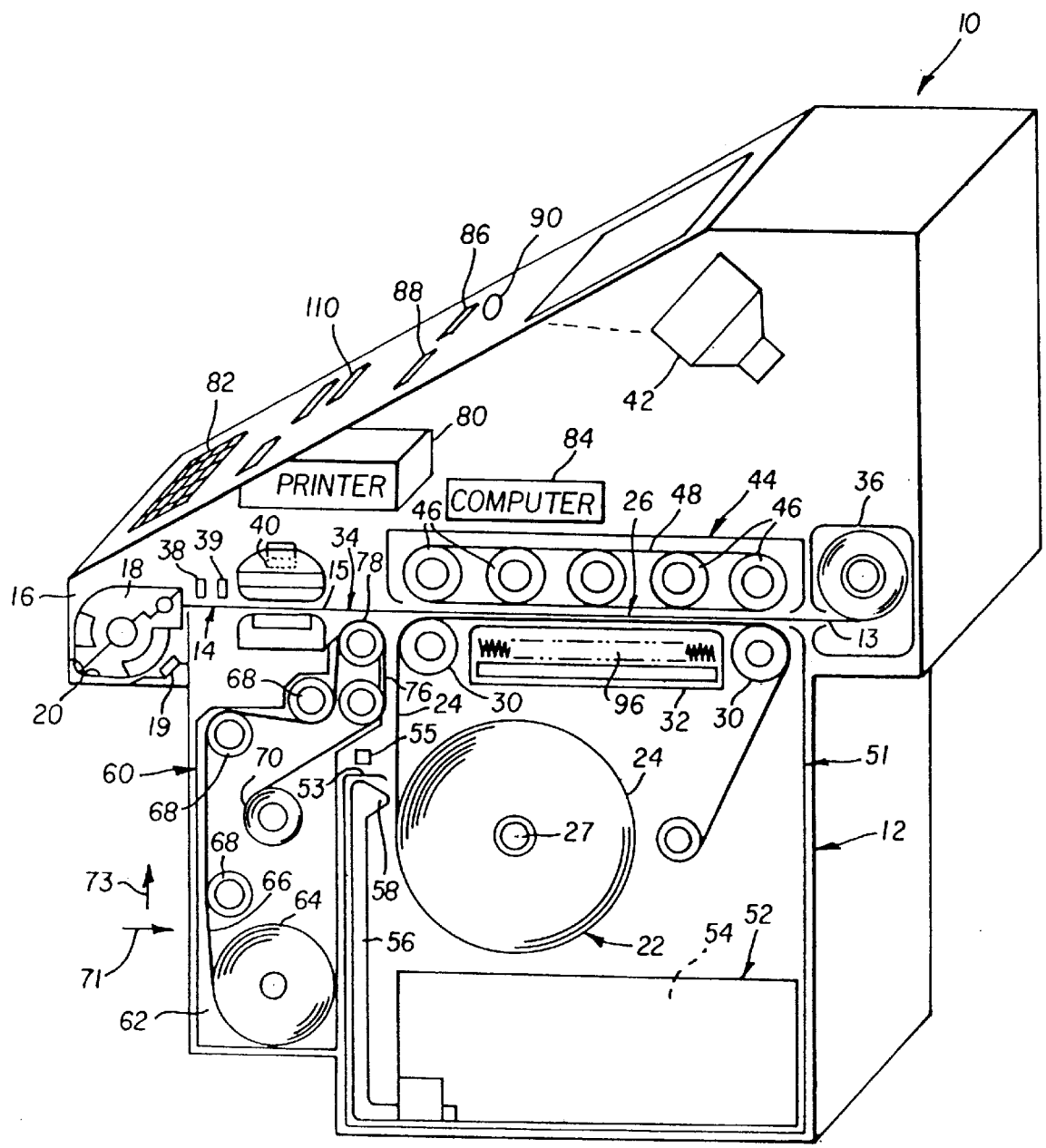
FIG. 1 is a perspective view of an apparatus made in accordance with the present invention partially broken away illustrating the components in schematic form.

Referring to FIGS. 1–5, there is illustrated schematically a photofinishing apparatus 10 made in accordance with the present invention. Preferably as illustrated apparatus 10 is a customer self service kiosk which does not require retail sale persons or an operator. The apparatus 10 includes a development section 12, as shown separately by FIGS. 2–5, for developing exposed images on a photosensitive media. In the particular embodiment illustrated, the development section 12 is designed to be a Bi-Mat development system. For the purposes of the present invention, a Bi-Mat type development system shall be considered a system which utilizes a single processing solution to fully develop the photosensitive emulsion layer on a supporting substrata. In the particular embodiment illustrated, the photofinishing apparatus 10 is designed to process photographic film 13 having a front side 14 and a back side 15 with a photosensitive emulsion layer on the front 14. The apparatus 10 includes a holding mechanism 16 for holding a film cartridge 18, which is designed to hold photographic film 13. In the particular embodiment illustrated, the film cartridge 18 is of the thrust film type, such as illustrated in U.S. Pat. Nos. 5,200,777 and 5,031,852 which incorporates the references in their entirety. In such thrust film cartridges, the film can be automatically thrust out of or back into the film cartridge 18. The photographic film 13 is helically wound about a film core (not shown), which is rotatably mounted to the cartridge 18. A light valve (also not shown) is rotatably mounted to cartridge 18 adjacent an opening in cartridge 18. When the light valve is in the open position film 13 may to be either thrust out, or thrust back into the cartridge 18 by rotation of the core in the appropriate direction. A transport mechanism is provided for moving film 13 along a film processing path 34. In the particular embodiment illustrated, the transport mechanism for moving the film motor (not shown) provided in apparatus 10 engages and rotates the core of the cartridge.

In the particular embodiment illustrated, the holding mechanism includes an opening 20 having an inner configuration designed to mate with the outer configuration of the film cartridge 18. In the embodiment illustrated the opening 20 is oriented in a direction substantially perpendicular to processing path 34. This allows the end of the core of cartridge 18 to easily engage the motor used to rotate the core. Once properly engaged in the opening 20, film 13 can be thrust out of, or into cartridge 18 as appropriate. A sensor 19 is provided for reading the film DX code on cartridge 18. The DX code contains information that can be used by apparatus 10 for determining if the film 13 contained therein is suitable for processing by apparatus 10 and for selecting the appropriate algorithm for processing of the scanned image data as discussed later herein.

Development section 12 includes a supply reel 22 having a donor web 24 wound around a core 25. The donor web 24 is unwound from supply reel 22 through a film processing section 26 by a motor (not shown) which drives the core 27 of a take-up reel 28. A pair of guide rollers 30 provides for guiding donor web 24 through the processing section 26. A backer member 32 is provided between guide rollers 30 for providing a supporting surface for donor web 24, as discussed later herein.

The photographic film 13, when thrust out of the cartridge 18, is passed along a processing path 34, which extends through the film processing section 26 and terminates into a festoon 36 where the film is temporarily stored. Recently, an advanced photosystem (APS) has been introduced where a thin magnetic layer is provided on a photographic film for containing photofinishing and other information thereon. Disposed adjacent the cartridge 18 along the processing film path 34 there is provided a magnetic read/write head 38 for reading any information contained magnetically on the film and/or for writing magnetic information thereon. An infrared sensor 39 is provided adjacent read/write head 38. Infrared sensors can see through unprocessed film without exposing it. Processed film and unprocessed film provide different "IR" signatures. Thus it is possible to detect if the film has been fully or partially developed. A digital scanner 40, preferably of a high resolution, is provided for scanning images developed on film 13. The scanner 40, in the embodiment illustrated, is a linear CCD array (charge coupled device), which can scan the images and thereby produce a digital record of the images scanned. It is to be understood that scanner 40 may be any appropriate type digital scanner and is not limited to a CCD device. The image information obtained from scanner 40 is passed onto a computer 84, where the digital information obtained may be manipulated as appropriate. The digital images obtained by scanner 40 are displayed on display device 42, which in the particular embodiment illustrated, is a CRT. Thus, the user of the apparatus 10 can readily view images that have been developed on film 13.

A processing solution application system 50 is provided for applying a processing solution onto the donor web 24, which is then applied to the photographic film 13 as it passes through the film processing section 26. In the particular embodiment illustrated, the processing solution application system 50 includes a reservoir 52, which contains a processing/activator solution 54. An applicator nozzle 56 is provided for applying processing/activator solution 54 obtained from reservoir 52 onto donor web 24. In the particular embodiment illustrated, a pump (not shown) is used for supplying the processing/activator solution to outlet 58 of nozzle 56 which is then sprayed on to donor web 24. The nozzle outlet 58 is positioned at a point with respect to the web 24 which is before the web 24 comes in contact with the film 13. In the particular embodiment illustrated, the nozzle outlet 58 is positioned at a point adjacent the web 24 just after it has been taken from the supply reel 22. However, the nozzle outlet 58 may be located at any point before the web 24 contacts film 13. In the preferred embodiment illustrated the processing system 50 is provided a replaceable cartridge 51. Thus, any type chemistry may be provided in apparatus 10 capable of being applied on to a web. The cartridge 51 is provided with a machine readable code 53 that can be read by an appropriate sensor 55 provided in apparatus 10. The sensor 55 is connected to computer 84 in apparatus 10 which can determine what type developing chemistry has been provided to apparatus 10.

The processing section 26 includes a pressure applying mechanism 44, which is used to bias the film 13 toward donor web 20 as it passes through the processing section 26 such that it will be in imminent contact with the donor web 24 so that the processing solution 54 will be transferred from donor web 24 onto film 13 for development of the exposed images thereon. In the particular embodiment illustrated, the pressure applying mechanism 44 includes a plurality of rollers 46 having a belt 48 extending there-around. In the particular embodiment illustrated, the rollers are free wheeling such that the belt 48 will move along with the film 13 as it is being thrust from the cartridge into festoon 36.

Figure 2:
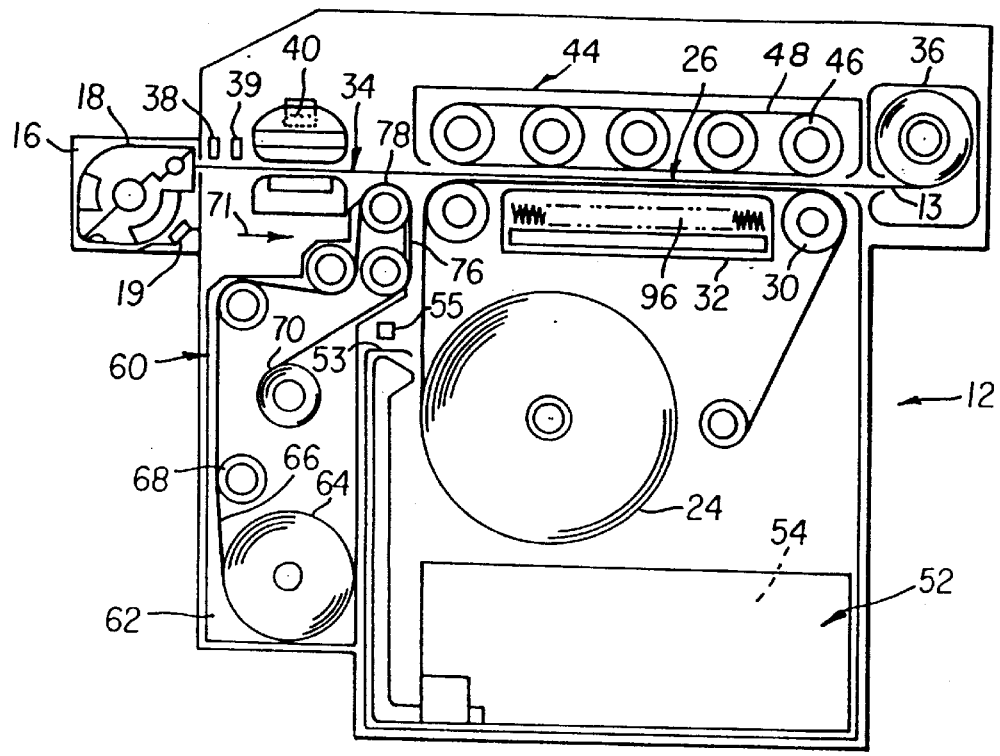
FIG. 2 is an enlarged view of the development section of the apparatus of FIG. 1 illustrating clearing of the donor web.
Figure 3:
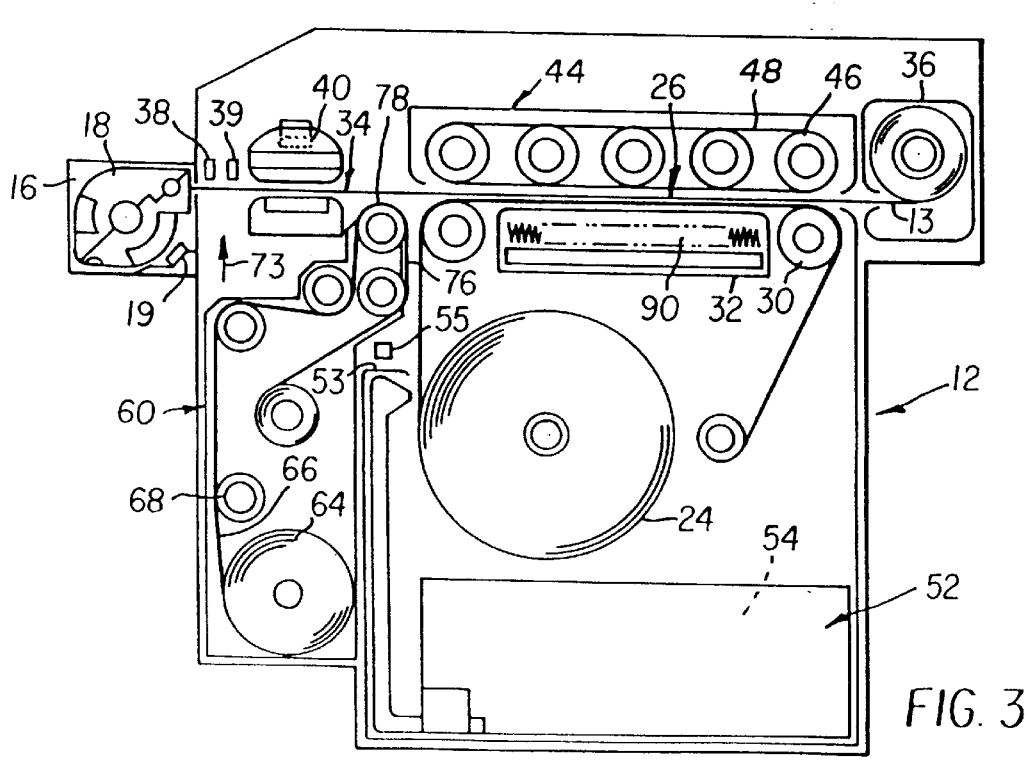
FIG. 3 is a view similar to FIG. 2 illustrating cleaning of the film.

A cleaning mechanism 60 is provided for cleaning donor web 24 and/or film 13 as described later herein. The cleaning mechanism 60 includes a support plate 62 having a supply reel 64 containing a cleaning web 66 made of a material capable of cleaning the donor web 24 and/or film 13. The cleaning web 66 is composed of an absorbent lintless fabric imbibed in a neutralizing agent such as a dilute form of acetic acid. The cleaning web 66 is guided about a plurality of guide rollers 68 and terminates in a take-up reel 70. In the particular embodiment illustrated, the supply reel 62 and take-up reel 70 are each rotatably mounted to the support plate 62 and are connected to respective drive motors, not shown, which allow the cleaning web 66 to be moved along cleaning path 72 formed by the guide rollers 68 in either direction. Thus, the cleaning web 66 may be wound onto the take-up reel 70, or in certain situations, driven in the reverse direction and rewound back onto the supply reel 64. The cleaning mechanism 60 includes a moving mechanism (not shown) comprised of two electrically energized solenoids to selectively move the cleaning web 66 into contact with either the processing web 24 or the film strip 13 by moving the support plate 62 in the directions indicated by arrows 71, 73 such that the cleaning web 66 of cleaning mechanism 60 may be in contact with the donor web 24 and/or for film 13. The rollers 68 are designed so as to provide a first contact section 76, such that when the cleaning mechanism is moved in a first direction toward web 24, the cleaning web 66 will be in contact with the donor web 26 as illustrated in FIG. 2. The path 72 includes a second contact section 78, such that when the cleaning mechanism 60 is moved in a second direction toward film 13, the second contact section 78 contacts the film 13 as illustrated in FIG. 3. Generally, the cleaning mechanism 60 will be cleaning the film 13 or web 66 at different times. However, if desired, the film 13 and donor web 24 may be cleaned at the same time. The cleaning mechanism is, of course, moved in the opposite direction for disengaging from the film 13 or donor web 24.

A printer 80 is provided for printing out of a customer order receipt 81 (see FIG. 11), as will be discussed later on herein. Apparatus 10 further includes a keypad 82 for allowing entry of information by the user to the apparatus, for example order information. The apparatus 10 may include any other data entry means for allowing entry of information. For example, but not by way of limitation, the display device 42 may be of the touch screen type whereby simply touching the viewing screen in the appropriate location, information may be entered into the apparatus 10. The computer 84 obtains information from the various components and sensors as is customarily done in such devices. For example, but not by way of limitation, computer 84 is appropriately connected with the magnetic read/write head 38, the scanner 40, printer 80, keypad 82 and CRT 42. The computer 84 is also used to control the general operation of apparatus 10 and all the other components, sensor, motors and controls in apparatus 10. The receipt 81 may include a variety of information, for example but not by way of limitation, information setting forth what was ordered, instructions provided by the customer, the cost of the order, a low resolution copy of each of the images ordered, and unique customer ID.

The apparatus 10 includes a plurality of different type devices whereby other information, including image and customer order information, may be entered. Image information as previously described is entered into apparatus 10 by supplying film that is digitally scanned. However, image information may be entered into the apparatus 10 by a variety of other means. For example, but not by way of limitation, a CD read mechanism 86, may be provided for reading of information provided on a CD, a computer disk reader/writer 88 may be provided for reading and writing information onto a standard computer disk, flash memory card reader 90 for reading flash memory cards, or by an appropriate communication link using a modem as is well known. It is, of course, understood that the image data may be obtained in any appropriate digital form as presently available, or may become available.

In order to better understand the present invention, a description of the operation of apparatus 10 will now be discussed.

A film cartridge 18 containing a strip of exposed, but undeveloped film 13, is provided and placed in holding mechanism 16. The DX code is read by sensor 19 so as to determine the type of film present within the film cartridge 18. This information is passed on to computer 84 to determine if film 13 may be processed by the processing solution contained in apparatus 10. Additionally, knowing the particular film type and chemistry in apparatus 10, an appropriate image manipulation software program may be applied by computer 84 to correct and/or adjust the images read by scanner 40. Such algorithm may be easily determined by knowing the original type of film, the processing solution the film was originally designed to be processed by and the affect that the processing solution present in the device will have on the film. Thus, even if the processing solution present in apparatus 10 was not designed to be used with or is not totally compatible with the film 13 within the cartridge 18, appropriate digital images may be obtained the by applying appropriate image modification algorithms to the scanned digital image data. Thus, images may be obtained as if the film was processed by a processing solution for which is was designed to be processed. In addition, since the film will be digitally scanned for obtaining of the image data, the film may be of the type that is not designed for optical printing, but designed only for scanning and printing thereafter. Thus providing additional latitude in the manufacture of the film. Potentially allowing for less expensive to manufacture films. If the film 13 within the cartridge 18 is compatible with the chemistry available, the film 13 is allowed to be processed by apparatus 10. The sensor 19 may also advise whether or not the film is capable of containing magnetically encoded information. If so, the magnetic head 38 will read appropriate information thereon and take appropriate action as required. Appropriate motors are activated for opening of the light valve of the film cartridge 18 and for thrusting of the film 13 out of the cartridge 18 along film processing path 34. An appropriate drive motor (not shown) is activated for moving of the donor web 24 from supply reel 22 through the film processing section 26 to take-up reel 28 in coordination with the movement of the film 13. At the same time, processing solution 54 is drawn from reservoir 52 and passed on through applicator nozzle 56 through nozzle outlet 58 onto the donor web 24 so as to apply an appropriate processing solution thereon. The amount of processing solution applied to donor web 24 is controlled such that substantially no processing solution drips or falls from donor web 24. The donor web 24 is appropriately advanced such that the donor web having the processing solution therein will appropriately contact the portion of the photographic film 13 having images thereon. Therefore, the donor web 24 may need to be initially transported prior to the film reaching the film processing section. A thin layer of developing solution is applied to the surface of the donor web 24, which will come in contact with the emulsion side of the film. As the emulsion on the film on donor web 24 and film 13 pass through the processing section 26, pressure is applied by pressure application mechanism 44, causing the emulsion side of the film 13 to be forced against the backing member 45 (see FIGS. 1–3). By the time the film 13 reaches the end of the film processing section 26, the film 13 will have subjected to a sufficient amount of processing solution for development of the latent images.

Figure 4:
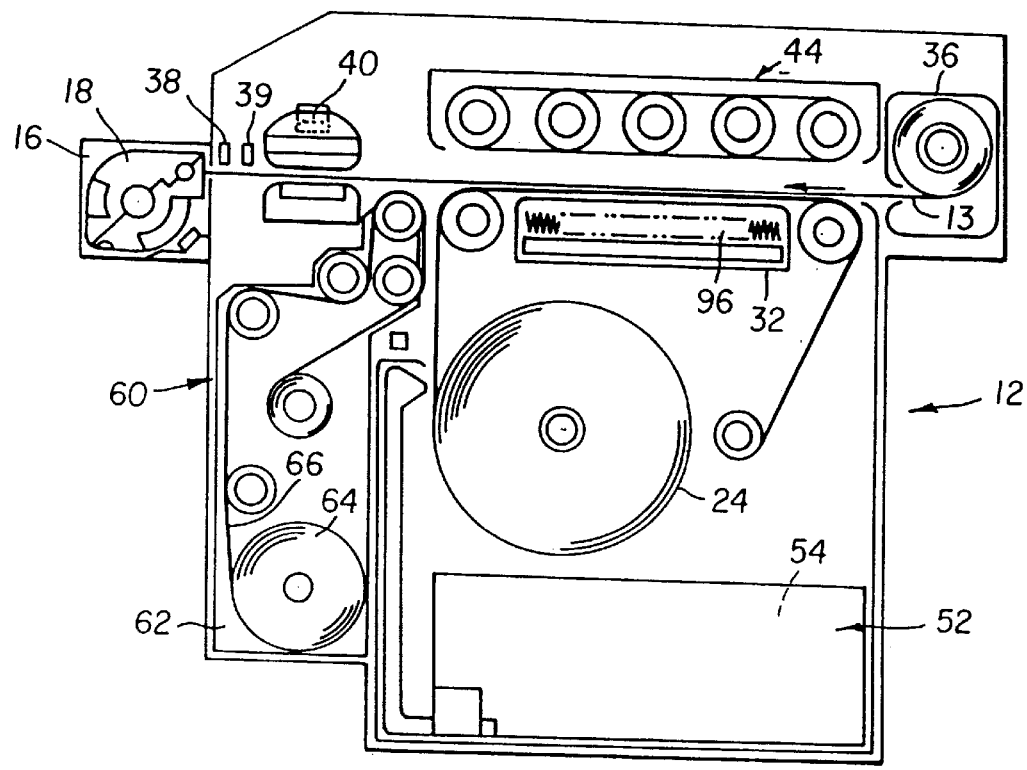
FIG. 4 is a partial diagrammatic representation of the apparatus of FIG. 1 illustrating the rewinding of the film back into the cartridge.
Figure 5:
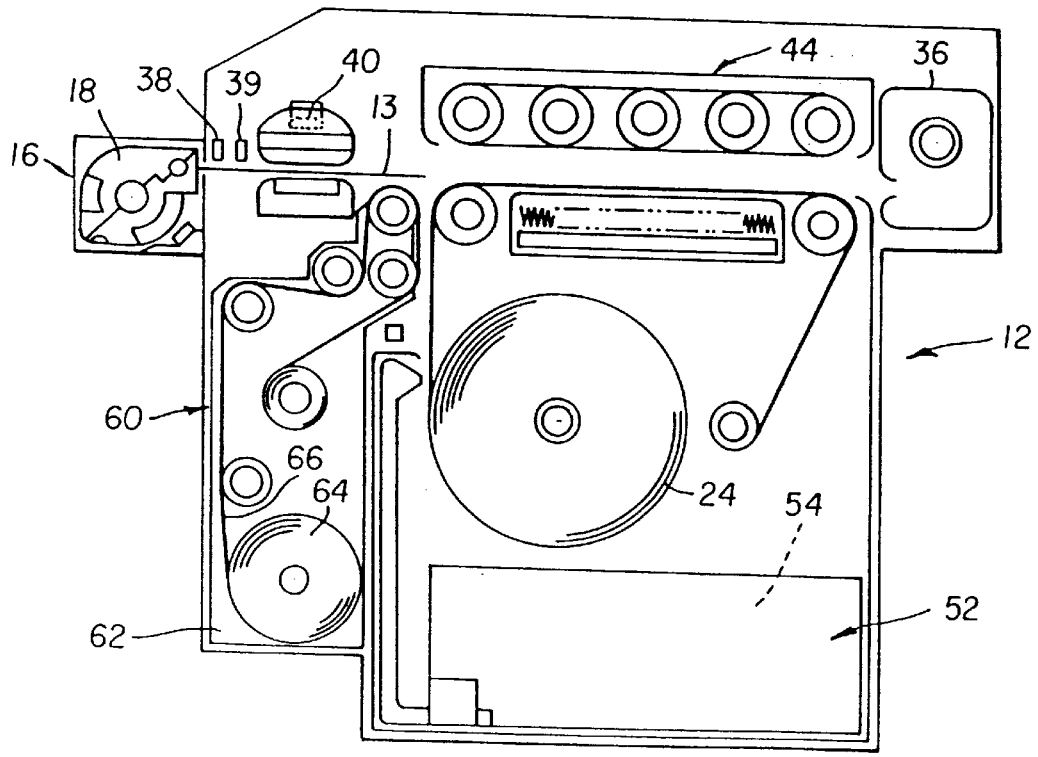
FIG. 5 is a view similar to FIG. 4 illustrating the film almost fully rewound back into the cartridge.

After the film 13 has been completely processed, the pressure application mechanism 44 is withdrawn as illustrated in FIGS. 4 and 5 and the film 13 is rewound back into thrust film cartridge 18. As the film 13 is rewound back into the cartridge 18, the magnetic head 38 reads any information that may be provided on the film 13. Additionally as the film is being retracted into cartridge 18, the scanner 40 will read the image information developed thereon. Prior to the film 13 being retracted into the cartridge 18, the cleaning mechanism 60 is positioned as illustrated in FIG. 3. The cleaning web 66 is moved in the appropriate direction as the film is being retracted thus cleaning the film 13, removing any excess processing solution that may be on the film 13 which could be detrimental to the film.

An advantage of the system according to the present invention is that it is possible to easily process only a portion of the available exposure area of film 13 without substantially affecting the unexposed portion of the film 13 for later exposure and processing. For the purposes of the present invention, the available exposure area shall mean that portion of the film that is designed to be exposed for capturing of an image. The information that is recorded on the film 13 by head 38 may include information that only a portion of the film 13 has been exposed. In which case, the film 13 is only thrust out a sufficient distance, such that only the exposed area of the film 13 is passed into processing section 26 and only the portion that has been exposed is provided with processing solution. Alternatively, sensor 39 can distinguish between process and unprocessed film, thus allowing only the unprocessed section to be processed. The apparatus 10 is operated in the same manner previously discussed, except that now during retraction of the film 13 back into cartridge 18, the magnetic head will record information that a portion of the film has been developed, so that when the film is again placed in apparatus 10, or other similar device, the apparatus 10 will recognize that only the newly exposed portion of the film need be developed. Therefore, only the remaining exposed non-developed portion will be processed.

Figure 6:
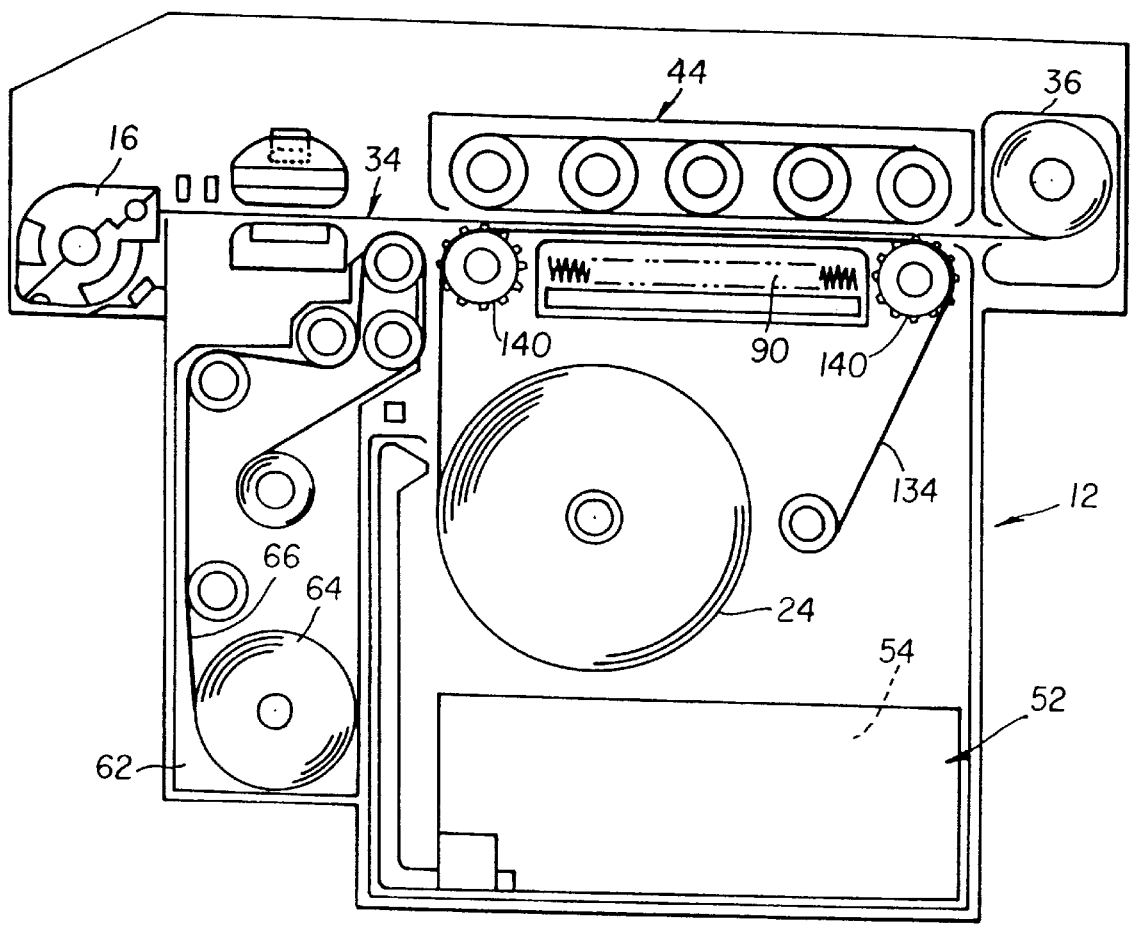
FIG. 6 is a modified development section mode in accordance with the present invention.
Figure 7:
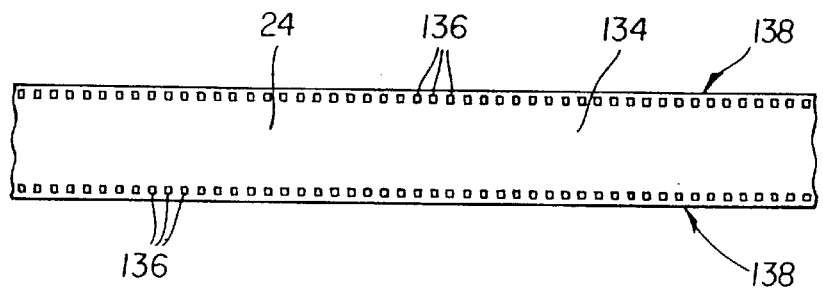
FIG. 7 is a modified donor web and drive used in the apparatus of FIG. 6.

In the embodiment illustrated in FIGS. 1–5, the donor web 24 is moved by a motor connected to core 27 of take-up reel 28. In order to more precisely control the amount of processing solution being applied to film 13, it is important to control the amount of movement of the donor web 24. Referring to FIGS. 6 there is illustrated a modified mechanism 130 which is similar to apparatus 10 like numerals indicating like parts and operation. In this embodiment donor web 134 (see FIG. 7) is provided with a plurality of equally spaced perforation 136 along both sides 138 of the donor web 134. Perforations 136 engage sprocket wheels 140 used to drive donor web 134 along the processing path 26. The engagement of sprocket wheels 140 with perforations 136 provides a positive drive whereby substantially no slip can occur. The sprocket wheels are driven by a stepper motor, not shown. By turning sprocket wheels 140 at a precise rate, the positive drive of web 124 will result in a precise amount processing solution being applied to web 134 and in turn on to film 13.

Figure 8:
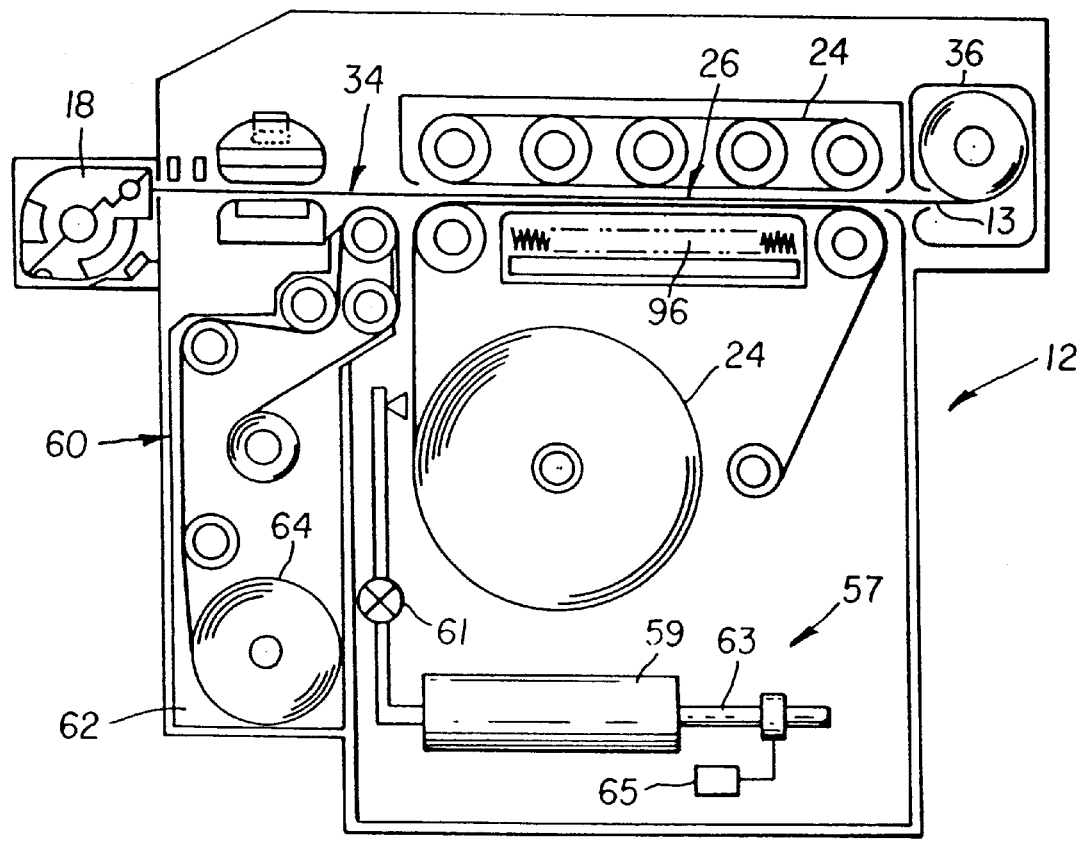
FIG. 8 is another modified development section mode in accordance with the present invention.

Referring to FIG. 8 there is illustrated a modified application system for use in the development section 12. In order to accurately meter the amount of processing solution being applied to web 24, a pressurized valve control system 57 is provided. In the particular embodiment illustrated, a tube 59 is provided containing an appropriate processing solution, preferably in a generally paste form. A control valve 61 is used for precisely monitoring the amount of processing solution being applied. When valve 61 is in the open state the processing solution will be allowed to go therethrough at a predetermined rate. A ram 63 is pushed by motor 65 which applies continuous pressure to the contents of tube 59. The amount of time the valve is open will determine the amount of solution being applied. The valve 61 is controlled by computer 84 so that the required amount of processing solution will be applied to web 24 and then to film 13.

In order to improve the speed of processing, an optional heater 96 may be provided for increasing the activity of the processing solution applied to the film 13 in the film processing section 26. Additionally, if so desired, the backing mechanism may be designed to vibrate, which may also improve the processing speed, or efficiency of the processing solution applied to film 13.

Figure 9A:
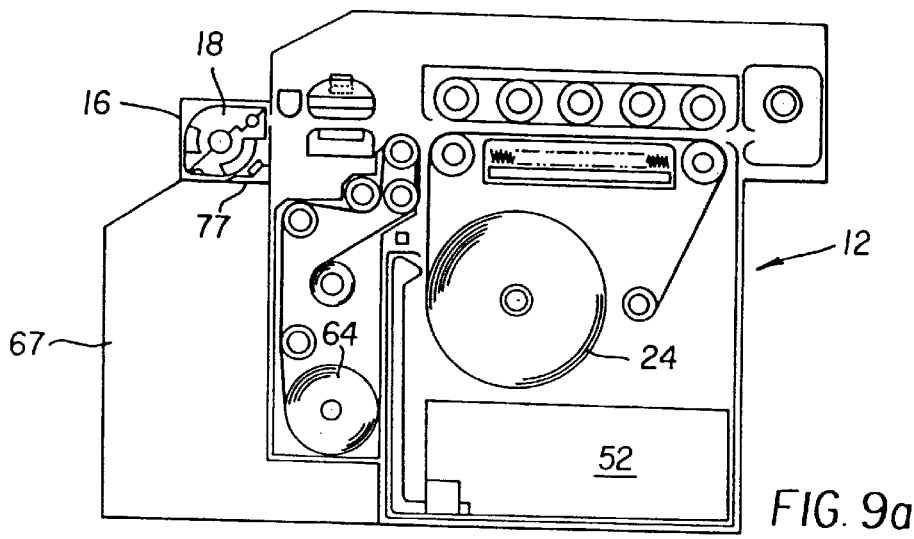
FIGS. 9a–9c illustrates still another modified apparatus mode in accordance with the present invention.
Figure 9B:
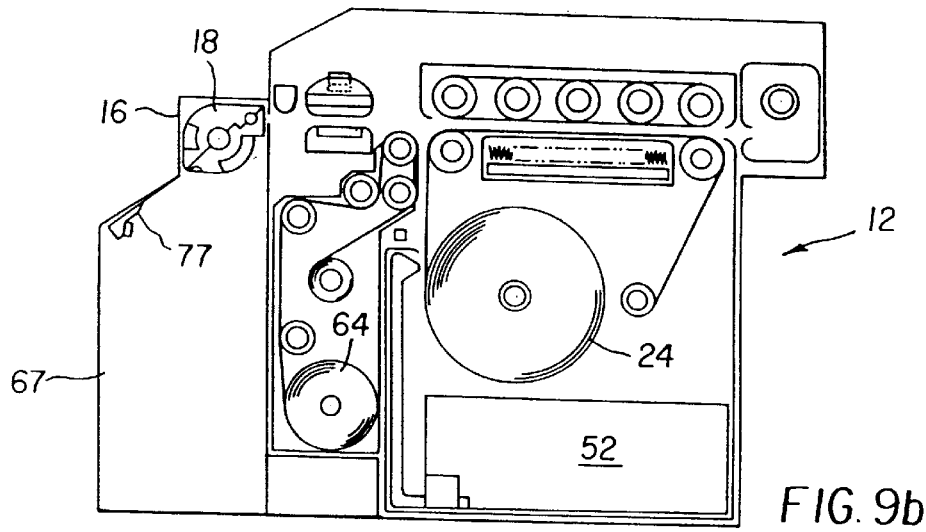
Figure 9C:
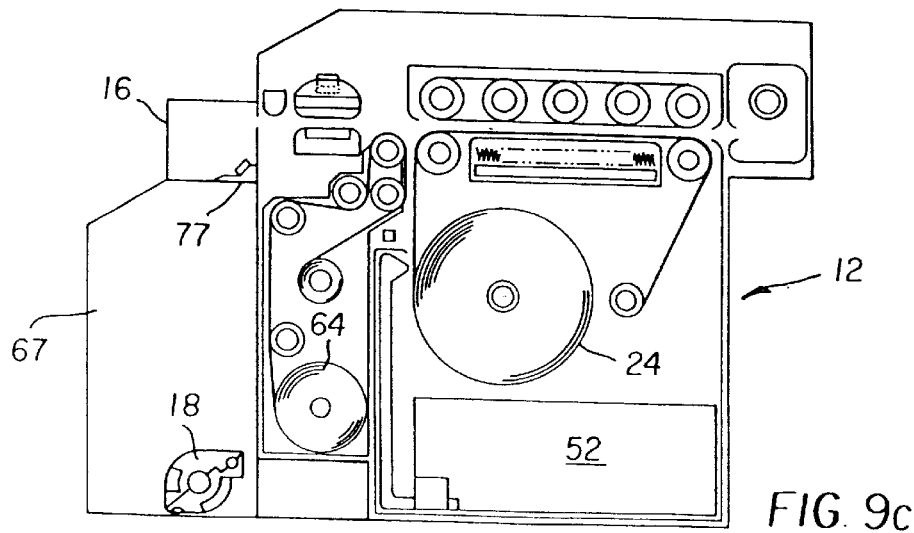

After the film has been processed and scanned, appropriate images may be displayed by display device 42, allowing the customer to review the images that have been developed and for ordering of hardcopy prints and/or other photographic products, such as photo CD's, computer disks, photo albums. Thereafter, the film cartridge may be deposited directly into apparatus 10. Referring to FIGS. 9*a*–9*c* there is illustrated a modified development section 12 for use in apparatus 10. After the film has been rewound into the cartridge 18, the cartridge may be deposited into a receiving chamber 67 by the opening of trap door 77 as shown in FIG. 9*b*. In the embodiment illustrated a motor (not shown) is used to open and close trap door 77 which is controlled by computer 84. After the cartridge 18 has been deposited in chamber 18 the door is returned to it's normal position as shown by FIG. 9*c*. By using the information supplied by the customer, the information read from the cartridge a receipt 81 (see FIG. 11) may be printed for the customer. The cartridge ID can be used for the identifying of the order that the customer has placed. There is no need for an order envelope as all the information for completion of the order has been obtained.

Figure 10A:
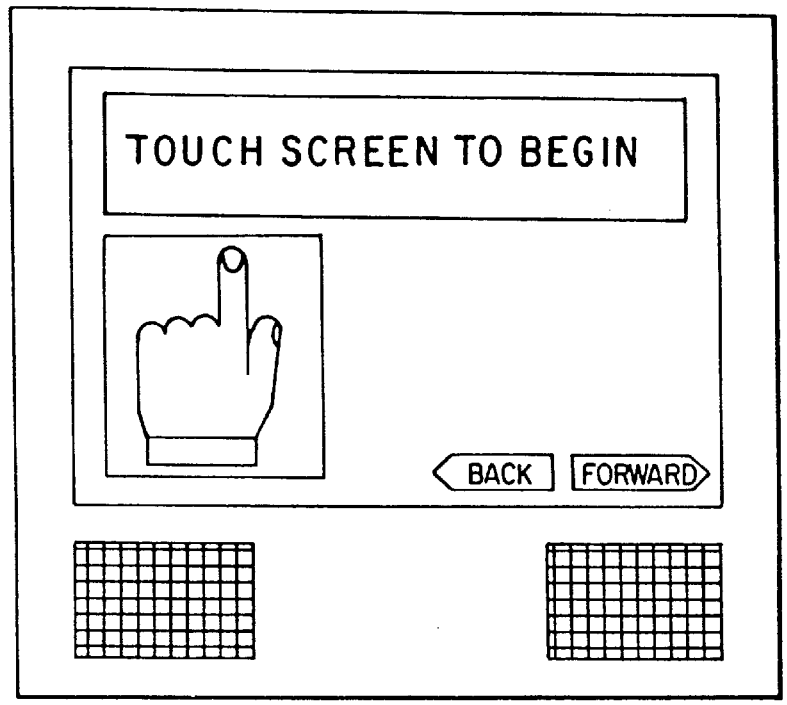
FIGS. 10a–10h illustrates various screens used to control operation of the apparatus and for ordering of image products.
Figure 10B:
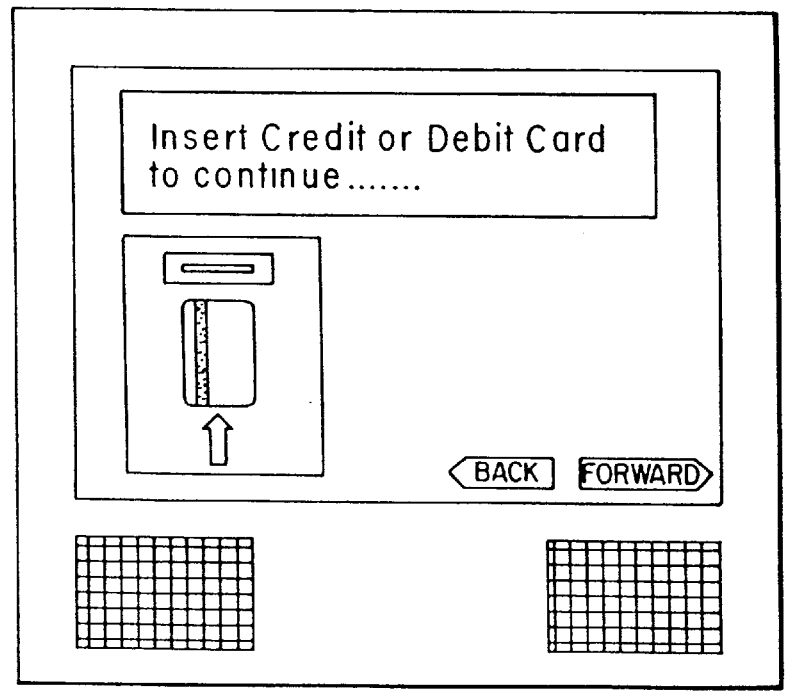
Figure 10C:
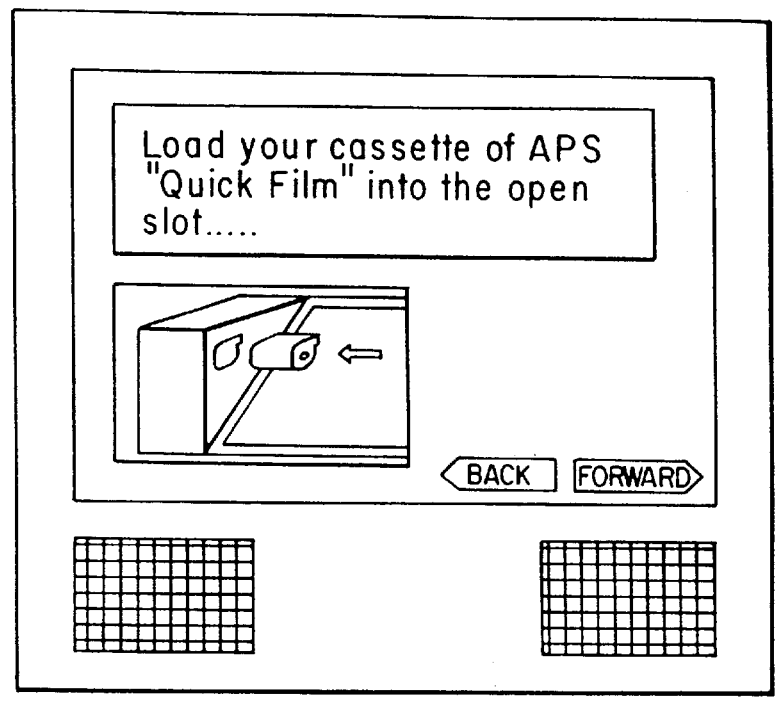
Figure 10D:
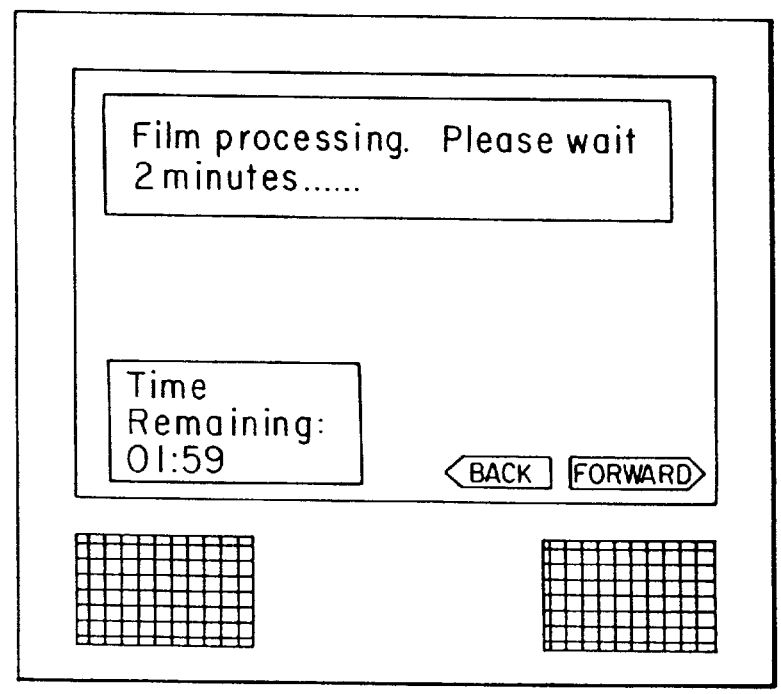
Figure 10E:
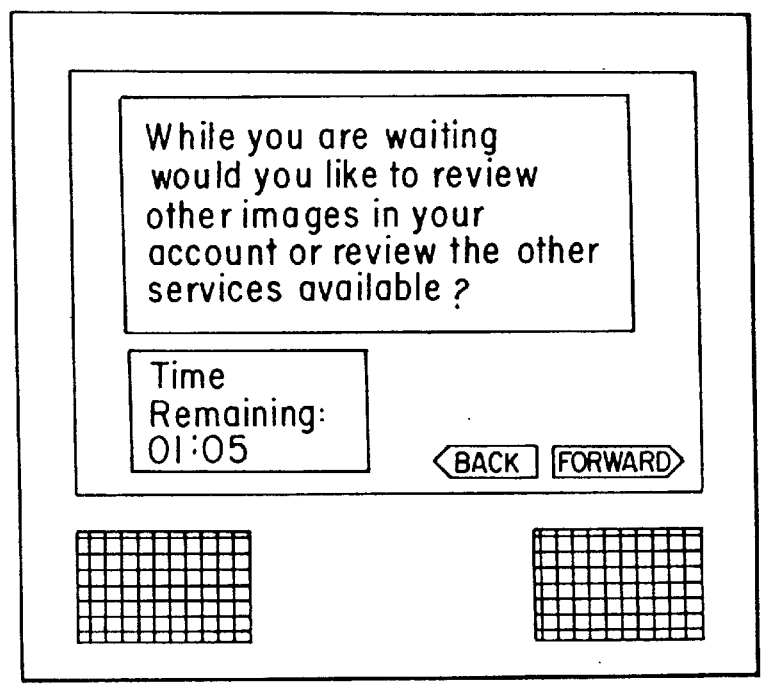
Figure 10F:
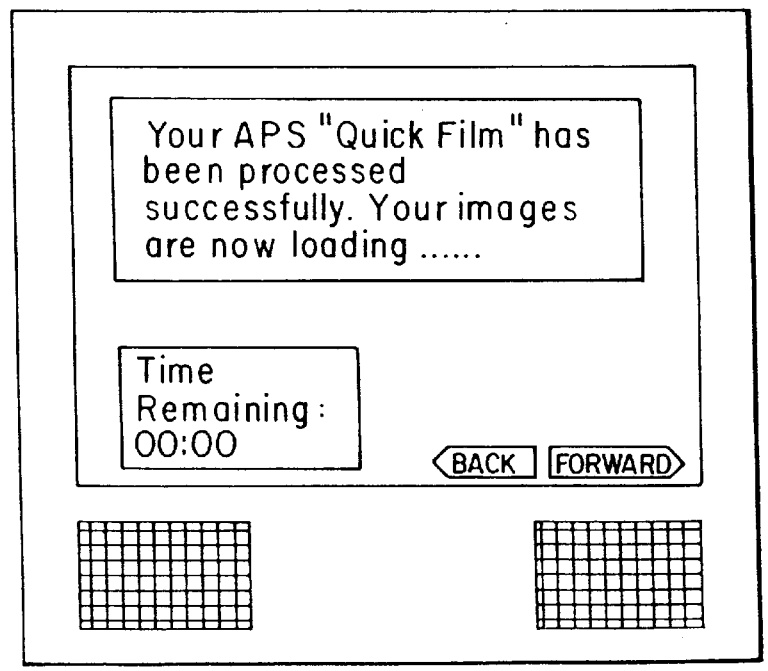
Figure 10G:
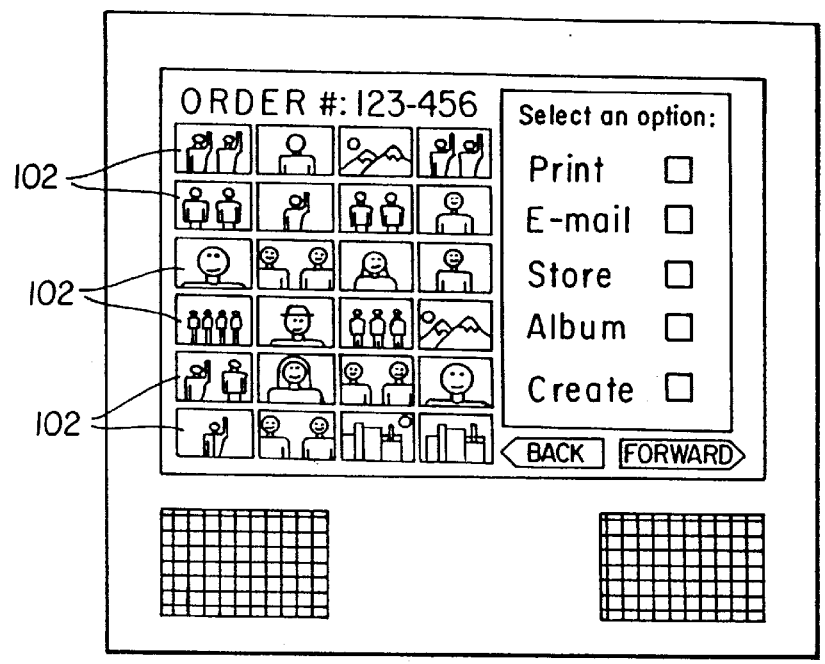
Figure 10H:
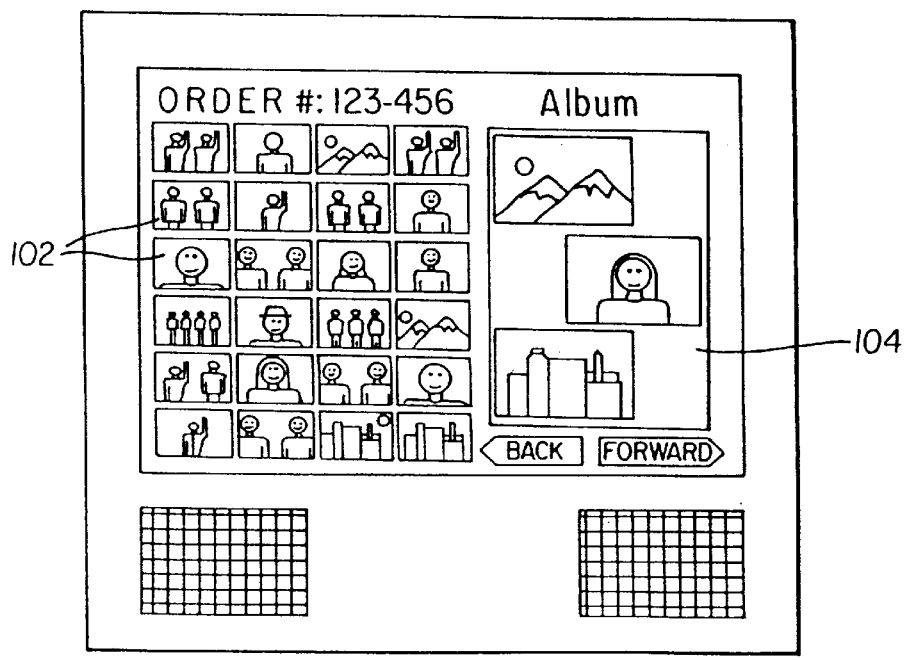

Referring to FIGS. 10*a*–10*h*, there is illustrated various instructions that may be provided on the display device 42. FIG. 10*a* illustrates an initial screen that allows the user to enter selections by simply touching of the screen. FIG. 10*b* provides instructions for the desired method of payment. In the particular embodiment illustrated, payment may be made by credit card, however, the apparatus 10 may be provided with a variety of payment means for making payment, including the appropriate cash receiving mechanisms (not shown) and credit card receiving means for allowing debiting of credit card accounts. Any payment means may be provided to apparatus 10. FIG. 10*c* illustrates and provides directions on how the film cartridge 18 may be inserted into the apparatus 10. FIG. 10*d* provides instructions to the user and advises the amount of time remaining for processing. While the apparatus 10 develops the images in a relatively short period of time, during the development process there is provided an opportunity to display the various products available and/or allow the consumer to do other things with his account as shown in FIG. 10*e*. For example, using a unique customer ID to review images that may have been previously stored in the customer's account. Referring to FIG. 10*f*, the consumer is advised if the film 13 has been developed and that it is ready for review. FIG. 10*g* illustrates various order options and the images that have been developed. It is, of course, understood that the display device 42 may provide as many appropriate options as desired and provide the images in any desired format. In the particular embodiment illustrated, all the images developed on film 13 are shown as small images (imagettes) 102. However, appropriate means may be provided for reviewing one, or as many as desired at a single time. Additionally, the computer may be programmed for allowing the customer to modify any of the images. For example, but not by way of limitation, zooming and/or cropping of the image, color enhancements, or for allowing customization and modification of the image. FIG. 10*h* illustrates how a selected portion of several images will be produced as an album page, illustrated by item 104, so that the consumer will have some idea as to how the ordered product will look.

Figure 11:
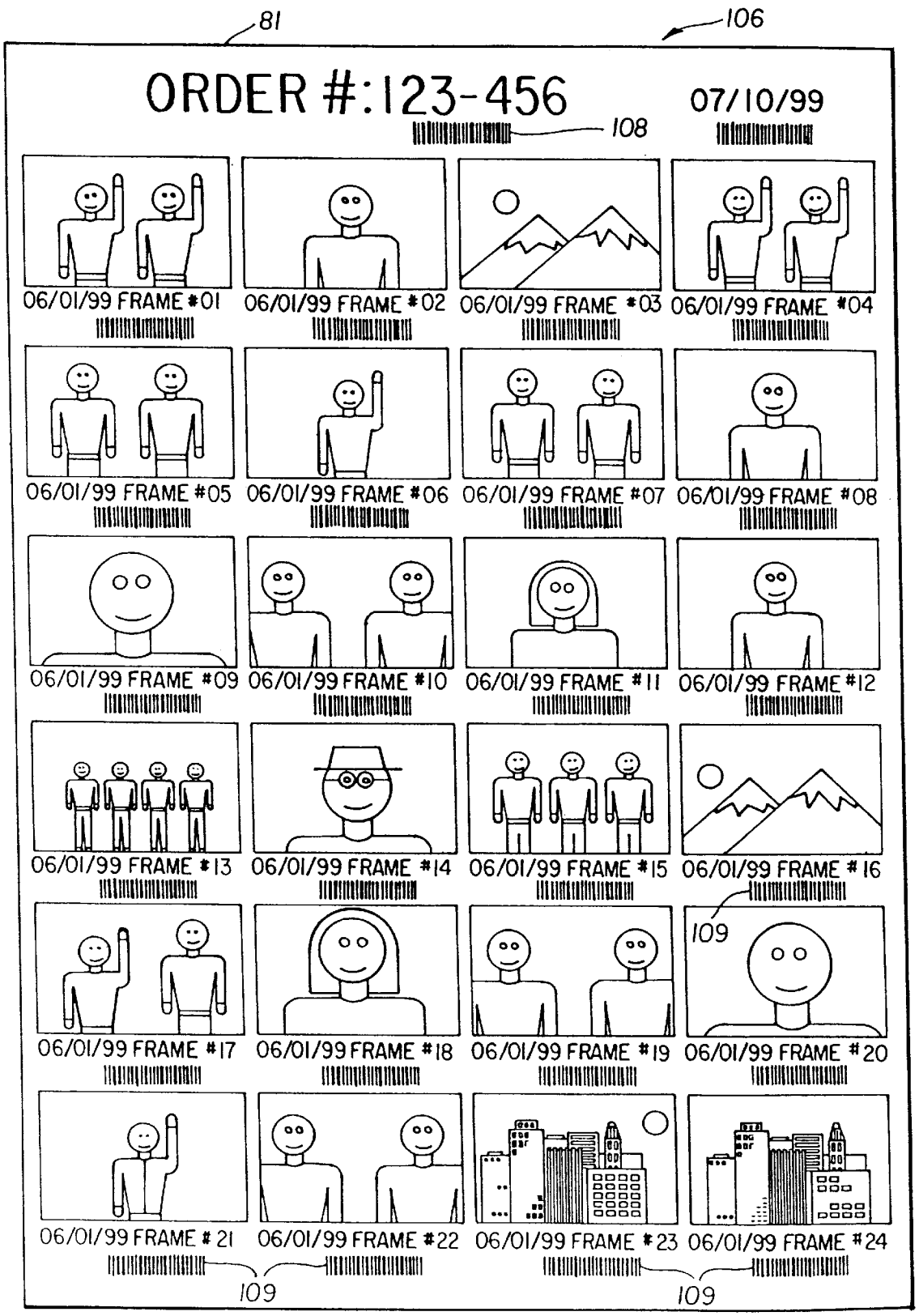
FIG. 11 is a receipt which is printed by the apparatus of the present invention.

Printer 80 provides a receipt 81 as is illustrated in FIG. 11. The receipt 81 can include a variety of information, for example, a unique order number 108, a copy of each of the images that were selected for ordering, and image ID 109 associated with each image. In the embodiment illustrated the image ID 109 is a bar code which is unique for each image. The order number 108 and image ID 109 may be provided in any desired format, preferably a machine readable format. Additional information may be provided on receipt 81, such as date and any other appropriate information that may be required or deemed desirable. For example, but not by way of limitation, the location at which the apparatus was used, the type of film, the type of processing used for development, the date on which the machine provided the processing, customer preferences, custom name, address etc.

Figure 12:
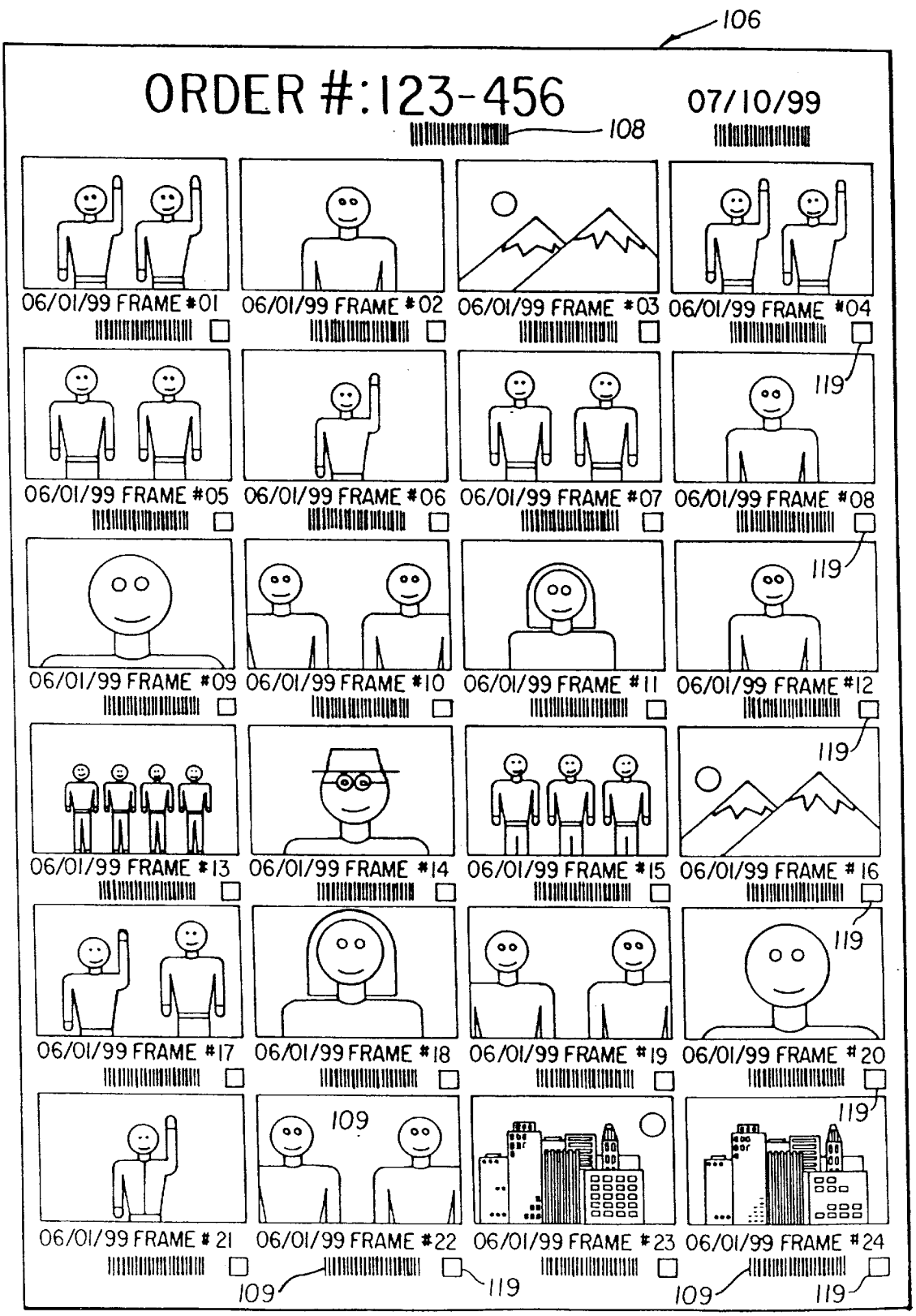
FIG. 12 is a second embodiment of a receipt printed by the apparatus of the present invention which can be used for ordering products and/or services.

In the particular embodiment illustrated, a customer places a photofinishing order through the use of the input device at apparatus 10 for fulfilling of the customer order at a central printing station (product fulfillment location) remote from apparatus 10. Preferably the customer order is electronically forwarded to the remote printing station where the order is filled. The completed customer order is then forwarded by any appropriate means to the customer at a designated location, such as the customer's home, the store where the apparatus 10 is located. The order may be sent by mail, courier or by any other means. The printer 80 may also provide an order form 106, such as illustrated in FIG. 12. The order form 106 is similar to receipt 81 but also includes order selection boxes 119 that can be filled out by the customer. The form 16 can then be fed into the apparatus through a receipt order slot 110 for reading and placement of the order. The order is then submitted to the appropriate location for completion. This system allows the user to take the images home and decide on the order as to whether or not additional copies or modifications are to be made. Additionally, should the user have a personal computer, the receipt ID 108 may be used to provide information for allowing the customer to have access to apparatus 10, and thereby placing the order electronically over the Internet, or allowing the consumer to have access to the images and making further modifications and then making the appropriate request for image products.

There are a variety of different image products that may be ordered, included but not by way of limitation, hardcopy prints on photographic paper or other media, album pages containing a plurality of images on one or both sides, a photo CD, computer disks containing images, or any other image product that may be produced now or by future technology.

Figure 14:
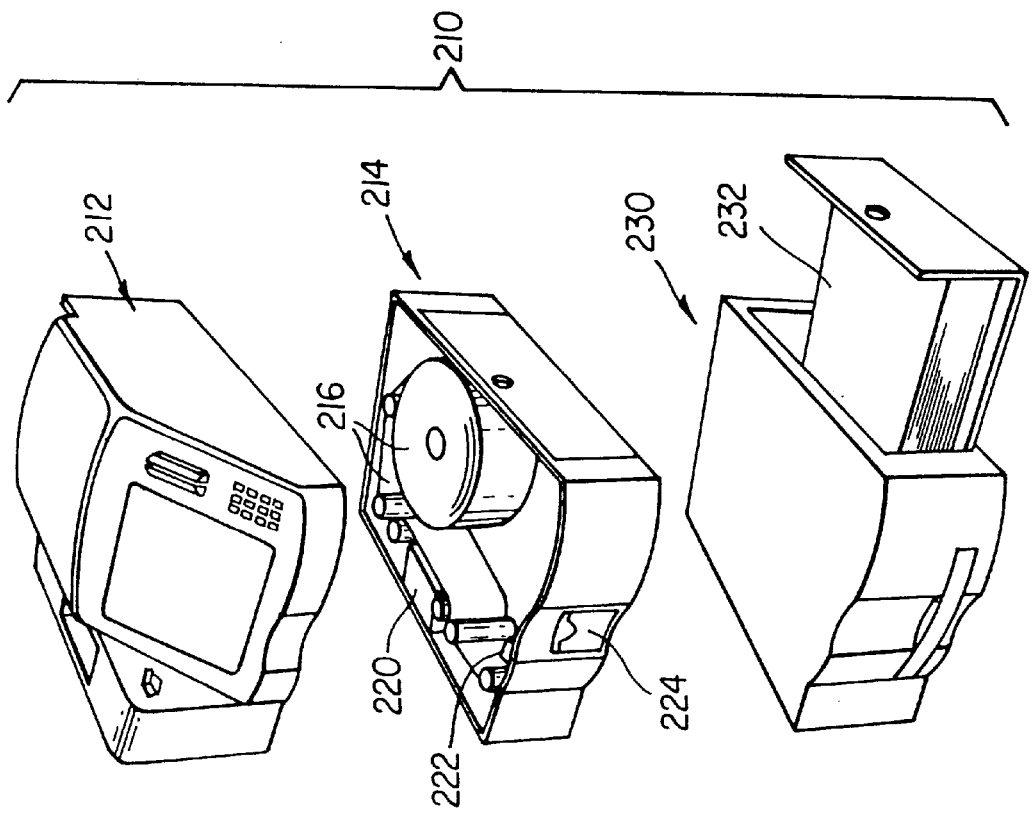
FIG. 14 is an exploded view of the apparatus of FIG. 10.
Figure 13:
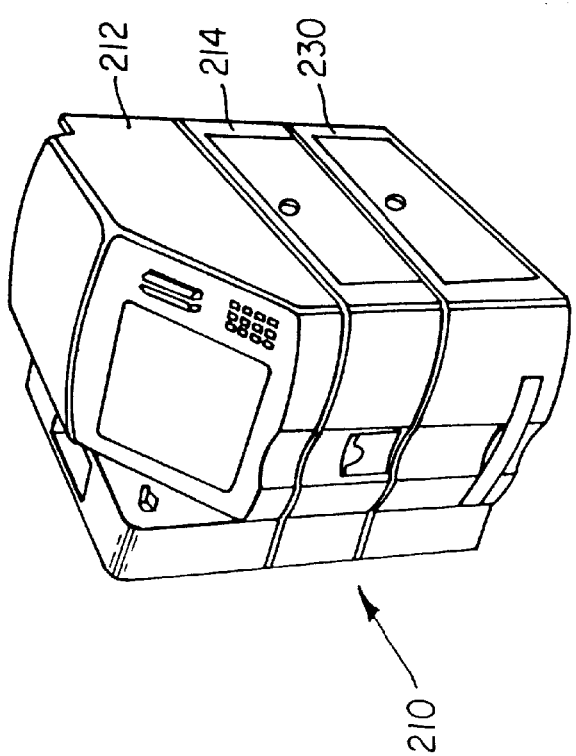
FIG. 13 is a perspective view of a modified apparatus made in accordance with the present invention.

As previously discussed, images are forwarded to a central printing station where the order is completed and then forwarded to the consumer. However, the present invention is not so limited. Referring to FIGS. 13 and 14, there is illustrated a modified apparatus 210 made in accordance with the present invention. In the embodiment illustrated apparatus 210 is a customer self service kiosk independent of a retail sales person or operator. FIG. 14 is an exploded view of the apparatus 210 of FIG. 13 illustrating its various sections. Section 212 is similar to the apparatus 10, with like numerals indicating like parts and operation. Section 214 illustrates a first printer section for printing images onto a web 216 that is wound about a core 218. In the particular embodiment illustrated, the printer section 214 includes an inkjet printhead 220 for printing onto web 216 as it passes thereby. A cutter 222 is provided for cutting of the web into individual image prints 224. Preferably, the prints 224 are delivered to a delivery tray section 226 whereby a customer may remove the order upon completion.

In the embodiment illustrated in FIGS. 13 and 14, the apparatus 210 includes a second printing system 230 for printing onto precut sheets 232 for printing large format images. In the particular embodiment illustrated, the printer system 230 is a large format inkjet printer capable of printing images onto sheets ranging in size from about 24" or 36" wide to 108" in length. An example of a suitable large format inkjet printer is sold by the Eastman Kodak Company under the tradename Kodak Digital Science 1000 PS large format inkjet printer. The printer system 230 provides the appropriate image in response to the image order entered into by the customer. While in the particular embodiment illustrated where an inkjet printer system is illustrated, it is to be understood that any other desired type of printing system may be utilized, for example, but not by way of limitation, thermal printers.

Figure 15:
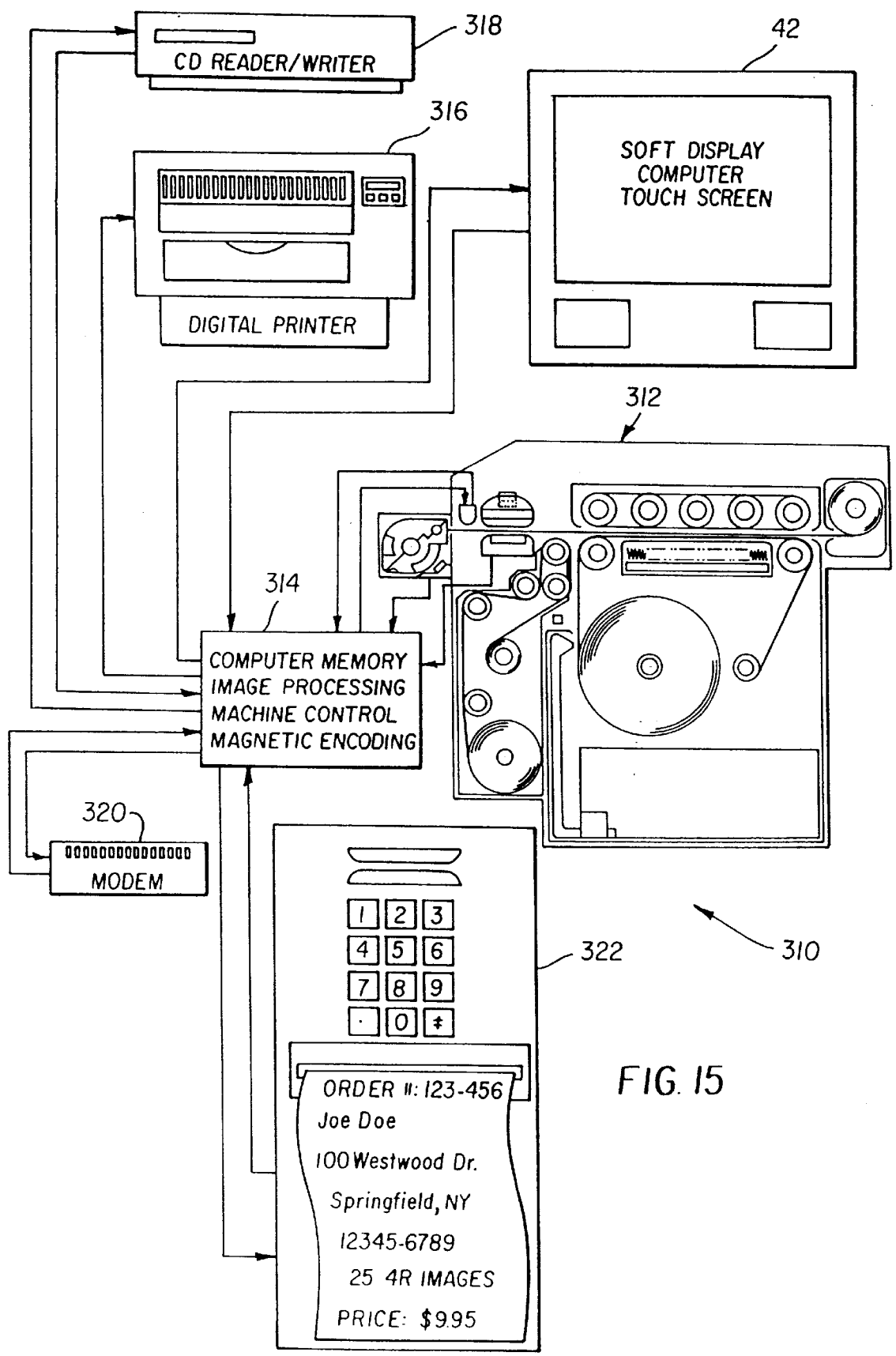
FIG. 15 is a schematic diagram of another embodiment of a system made in accordance with the present invention.

Referring to FIG. 15, there is illustrated another modified photofinishing apparatus 310 made in accordance with the present invention. The apparatus 310 is similar to the apparatus 10, with like numerals indicating like parts and operation, except that instead of being provided as a single integrated apparatus, apparatus 310 is broken down into various separate components. In the particular embodiment illustrated, the system 310 includes a separate developer section 312 wherein a cartridge 18 may be placed for developing and scanning in the same manner previously discussed with respect to apparatus 10. However, in this embodiment, a separate display device 42 is provided which is connected by appropriate wires or otherwise to computer 314. Computer 314 is connected by appropriate wires or otherwise to various output devices, for example; a digital printer 316 which can be used for printing of the customer image order; a CD reader/writer 318 which is capable of reading digital information provided by a customer and/or providing of an output product to be delivered to a customer; a modem 320 may be provided for communication to various other devices remote for printing of image products, or for receiving of image orders; and a second printer 322 may be provided for printing of a receipt 324. The receipt 324 can used by the customer for confirmation of the order when the image order is received.

Figure 16:
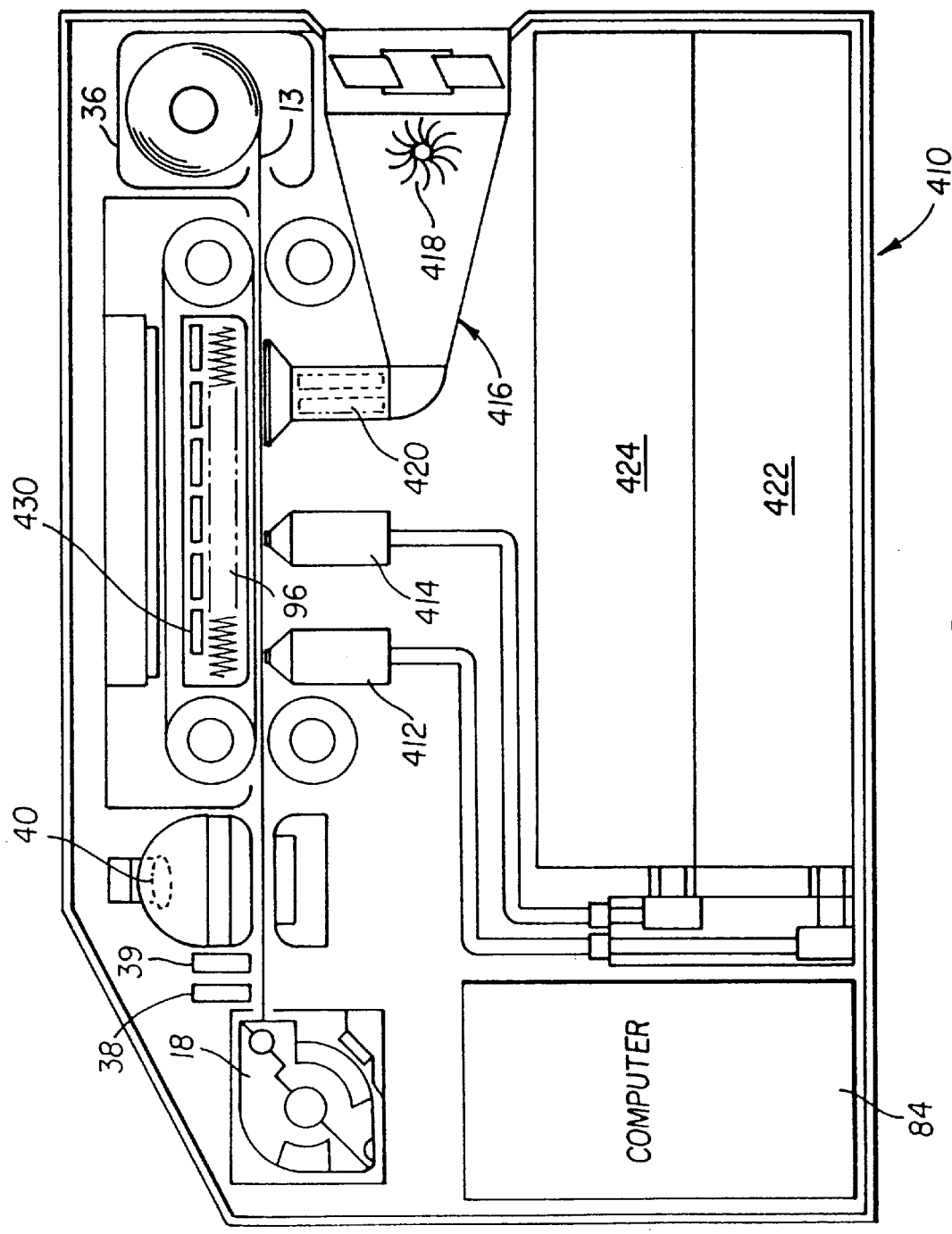
FIG. 16 is a schematic diagram of still another modified embodiment of an apparatus made in accordance with the present invention.

Referring to FIG. 16, there is illustrated a modified developing apparatus 410 made in accordance with the present invention. The apparatus 410 is similar to developing system 12, with like numerals indicating like parts and operation. In this embodiment, instead of providing a donor web 24 for application of processing solution, there is provided a nozzle spray system for providing of appropriate processing solution directly onto the photographic film 18. In particular, a pair of nozzles 412, 414 are provided for applying an appropriate activator and stabilizer, respectively, onto the film 13 as it is thrust past said nozzles 412, 414. A dryer 416 is provided for drying of film 13. In particular, the dryer 416 includes a blower 418 and a heating element 420, such that heated air is impinged upon the film 13 as it passes thereby. In the particular embodiment illustrated, the nozzle 412 is connected to a first reservoir 422 containing first processing and nozzle 414 is connected to a second reservoir 424 containing a second processing solution. It is, of course, to be understood that as many or few nozzles may be provided as appropriate for providing of the appropriate processing solution for processing of the photosensitive media A vibrating mechanism 430 is provided for enhancing the speed of processing.

The invention has been described in detail with particular reference to certain preferred embodiments thereof, but it will be understood that variations and modifications can be effected within the spirit and scope of the invention.

| PARTS LIST | |
|---|---|
| 10. apparatus | 52. reservoir |
| 12. development section | 53. code |
| 12. development section | 54. solution |
| 13. film | 56. nozzle |
| 14. front side | 57. system |
| 15. back side | 58. outlet |
| 16. holding mechanism | 59. tube |
| 18. film cartridge | 60. cleaning mechanism |
| 19. sensor | 61. control valve |
| 20. opening | 62. support plate |
| 22. supply reel | 63. ram |
| 24. donor web | 64. supply reel |
| 25. core | 65. motor |
| 26. processing section | 66. web |
| 27. core | 67. receiving chamber |
| 28. take-up reel | 68. guide rollers |
| 30. guide rollers | 70. take-up reel |
| 32. backer member | 72. path |
| 34. processing path | 76. first contact section |
| 36. festoon | 77. trap door |
| 38. magnetic head | 78. second contact section |
| 39. infrared sensor | 80. printer |
| 40. digital scanner | 81. receipt |
| 42. display device | 82. keypad |
| 44. pressure application mechanism | 84. computer |
| 45. locking mechanism | 86. CD read mechanism |
| 46. roller | 88. computer disk reader/writer |
| 48. belt | 90. flash memory card reader |
| 50. system | 96. heater |
| 51. cartridge | 102. imagettes |
| 104. item | 226. section |
| 106. order form | 230. system |
| 108. unique order number | 232. precut sheets |
| 109. image ID | 310. apparatus |
| 110. receipt order slot | 312. section |
| 119. order selection boxes | 314. computer |
| 124. web | 316. digital printer |
| 130. locking mechanism | 318. CD reader/writer |
| 134. web | 320. modem |
| 136. perforations | 322. printer |
| 138. sides | 324. receipt |
| 140. sprocket wheels | 410. apparatus |
| 210. apparatus | 412. nozzles |
| 212. section | 414. nozzles |
| 214. section | 416. dryer |
| 216. web | 418. blower |
| 218. core | 420. heating element |
| 220. inkjet printhead | 422. first reservoir |
| 222. cutter | 424. second reservoir |
| 224. prints | 430. vibrating mechanism |

What is claimed is:

1. A method for developing a strip of photosensitive media provided in a film cartridge, said photosensitive media having a back side, a front side, and an emulsion layer on the front side, comprising the steps of:

a) moving said strip of photosensitive media along a film path;

b) applying a developing solution on said emulsion layer so as to develop any exposed images present on said strip of photosensitive media;

c) scanning said strip of photosensitive media after said exposed images have been developed; and d) cleaning said strip of photosensitive media prior to returning said strip of photosensitive media to said cartridge.

2. The method according to claim 1 wherein said developing solution is applied to said strip of photosensitive media using a donor web having a processing solution thereon.

3. The method according to claim 1 wherein heat is applied to said strip of photosensitive media for increasing the speed of development.

\* \* \* \* \*